Figure 1:
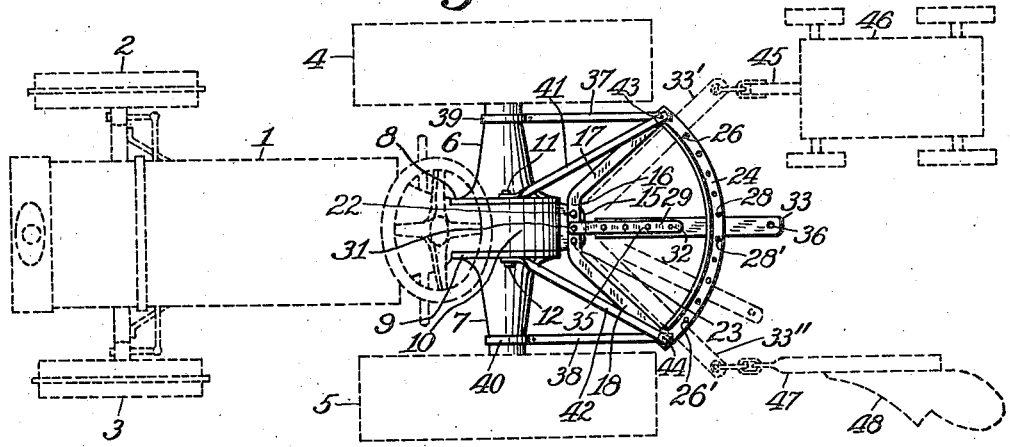

Jan. 22, 1924.

C. H. SELLARS ET AL 1,481,565

ADJUSTABLE TRACTOR DRAWBAR

Filed March 30, 1921

2 Sheets-Sheet 1

INVENTORS:
Clark H. Sellars,
Claire J. Sellars,

BY

E. F. Silvius,
ATTORNEY.

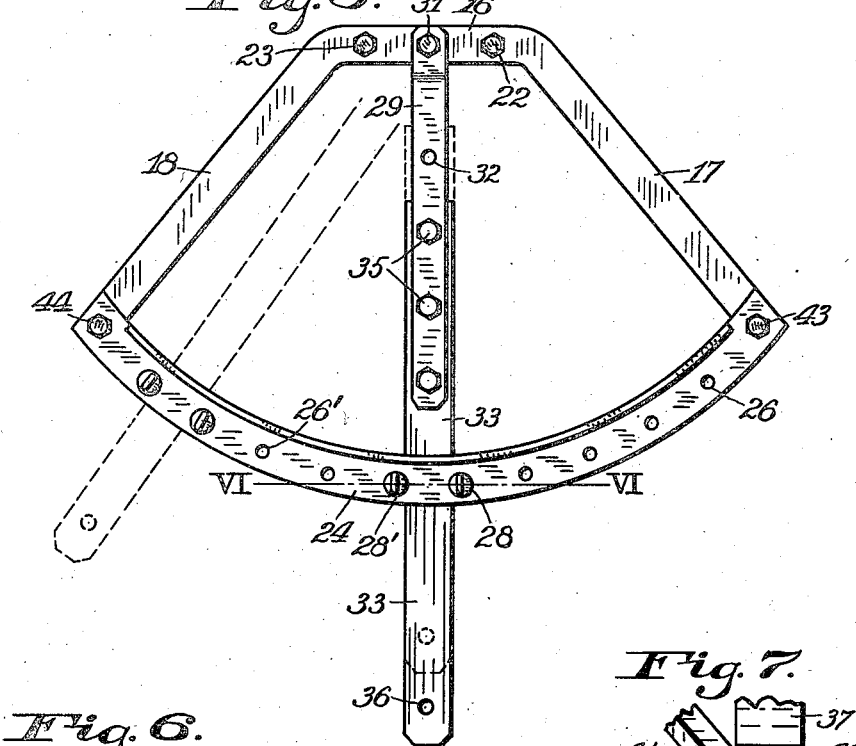

Patented Jan. 22, 1924.

1,481,565

UNITED STATES PATENT OFFICE.

CLARK H. SELLARS AND CLAIRE J. SELLARS, OF GUILFORD TOWNSHIP, HENDRICKS COUNTY, INDIANA.

ADJUSTABLE TRACTOR DRAWBAR.

Application filed March 30, 1921. Serial No. 456,997.

*To all whom it may concern:*

Be it known that we, CLARK H. SELLARS and CLAIRE J. SELLARS, citizens of the United States, residing in Guilford Township, in the county of Hendricks and State of Indiana, have invented a new and useful Adjustable Tractor Drawbar, of which the following is a specification, reference being had to the accompanying drawings and to the letters and figures of reference marked thereon.

This invention relates to the type of draw-bar that is designed to be applied to a motor vehicle, such as a tractor, for pulling vehicles, portable machinery or agricultural implements, either centrally behind the tractor or at one side of the line of draft or median line of the tractor, the invention having reference more particularly to a draw-bar apparatus of the above-mentioned character that is designed to be connected without material alteration to one of the popular types of tractors, and which may with slight variation as to details be adapted to be connected to various tractors.

An object of the invention is to provide a compact and substantial draw-bar appliance which shall be so constructed as to be strong and be readily adjustable so as to pull from various points relatively to the tractor, so as to be advantageous in qualifying the tractor for performing a wide range of service.

Another object is to provide an adjustable draw-bar apparatus that shall be so constructed as to be adapted to be readily applied not only to new tractors but to tractors already delivered from the factory, and which may be readily applied by the operator of the tractor who may not have special tools or shop facilities.

A further object is to provide an improved tractor draw-bar which shall be so constructed as to be readily adjusted to be capable of drawing a plow in such manner as to permit the driving wheels of the tractor to run on hard or unplowed ground to the best advantage, and without loss of effort due to operation on soft plowed ground.

A still further object is to provide an adjustable draw-bar for tractors which shall be so constructed as to enable the tractor to be advantageously turned about while drawing a vehicle or an implement, and to guide the vehicle or the implement to the best advantage when making turns in fields or elsewhere, which draw-bar structure shall be very strong and stiff and also durable and economical in use.

With the above-mentioned and other objects in view, the invention consists in a frame of novel construction having a draw-bar adjustably connected therewith, the frame being adapted to be secured in a novel and advantageous manner to a tractor; and, the invention consists also further in the parts and combinations and arrangements of parts as hereinafter particularly described and further set forth in the accompanying claims.

Figure 2:
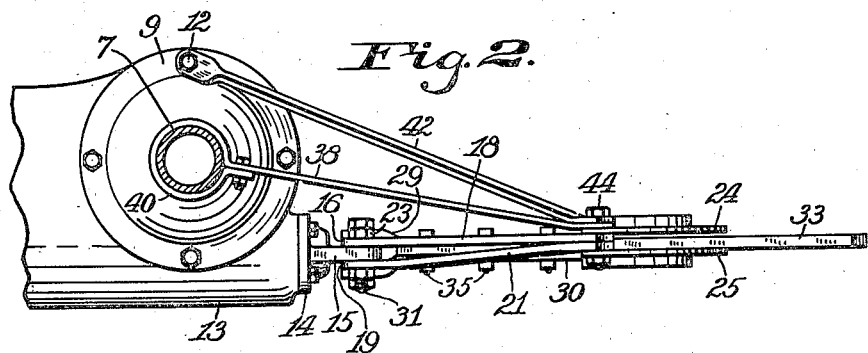
Figure 3:
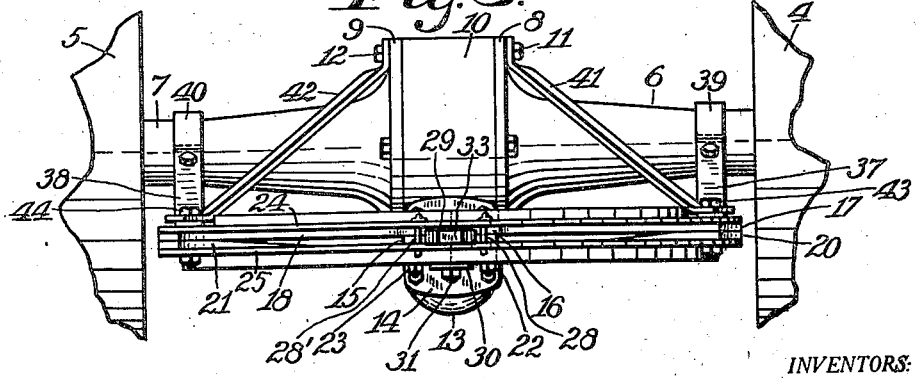

Referring to the drawings,—Figure 1 is a top plan of the improved adjustable drawbar illustrated as connected with a well known tractor which is generally indicated by broken lines, a wagon or trailer and also a plow being indicated by broken lines in positions in which they may be drawn by the tractor by means of the improved draw-bar apparatus; Fig. 2 is a side elevation on an enlarged scale of the improved draw-bar as applied to the tractor of which a portion is shown; Fig. 3 is a rear elevation of the draw-bar apparatus as applied to the tractor; Fig. 4 is a longitudinal central section of the main parts of the improved draw-bar apparatus; Fig. 5 is a top plan on an enlarged scale of the principal elements of the draw-bar apparatus; Fig. 6 is a fragmentary section on the line VI—VI in Fig. 5; and, Fig. 7 is a fragmentary detail on an enlarged scale clearly reproducing a portion of Fig. 3.

Similar reference characters in the different figures of the drawings indicate corresponding or like elements or features of construction herein referred to in detail.

The improved draw-bar apparatus is shown as preferably constructed for application to a popular tractor comprising a body 1 supported by forward guiding wheels 2 and 3 and large driving wheels 4 and 5. The driving wheels, as will be understood, are secured to axles operating in axle housings 6 and 7 that have flanges 8 and 9 secured to a differential gear case 10 by means of bolts 11 and 12. The under portion of the gear case has a driving gear housing 13 which is provided with a cap 14 having a draft-plate or lug 15 thereon to which trailers or implements hitherto have been hitched.

The improved draw-bar apparatus in its preferred form comprises a frame which has two principal parts, one part comprising a flat straight base bar 16 which is arranged upon the draft-plate 15 and has two arms 17 and 18 thereon that extend divergently each to the other; and the companion frame part comprises a flat straight base bar 19 arranged against the under side of the draft-plate 15 and having arms 20 and 21 extending under the arms 17 and 18 respectively and convergently thereto and into contact with the arms adjacent to their ends, the lower arms being suitably secured to the upper arms. The base bars are rigidly secured to the draft-plate 15 by means of bolts 22 and 23, the bolts being inserted in the two outer holes of the three found in the draft-plate. A guide bar 24 is arranged upon the arms 17 and 18 adjacent to their ends, and a guide bar 25 is arranged under the arms 20 and 21 adjacent to their ends and suitably secured thereto. Preferably the guide bars are curved as segments and composed of L-section angle iron. The upper guide bar has pin-holes 26, 26' suitably spaced apart and the lower guide bar has pin-holes 27, 27' arranged below those in the upper guide bar to receive stop pins 28, 28'.

An extensible or contractible draw-bar is provided which comprises a strap plate 29 arranged upon the base bar 16 and a strap plate 30 arranged under the base bar 19, the strap plates being connected to the base bars and the draft-plate 15 by means of a pivot bolt 31. The strap plates have suitably spaced bolt holes 32 and 32' respectively, and a tongue 33 is arranged between the strap plates and the guide bars and has a suitable number of bolt holes 34 spaced apart that receive bolts 35 inserted through the holes in the strap plates whereby the tongue is adjustably secured to the strap plates. The tongue may be moved towards either of the arms 17 and 18 and has a pin hole 36 adjacent to its outer end to which a clevis or shackle may be connected. Swinging movement of the draw-bar may be prevented by placing it between the stop pins 28 and 28' which may be placed in the pin holes in the guide bars as may be desired.

The draw-bar frame preferably is braced, and a pair of rods 37 and 38 are arranged at ends of the arms 17 and 18 respectively and preferably rest directly on the guide bar 24 adjacent to its ends, the rods being provided with suitable clamps 39 and 40 that embrace and are secured to the housing 6 and 7 respectively in proximity to the driving wheels. Preferably a pair of angle braces 41 and 42 are provided also, to laterally brace the frame, and have one end arranged upon the rods 37 and 38 respectively adjacent to the ends of the arms 17 and 18 respectively, the braces extending upwardly and convergently each towards the other and being secured substantially to the flanges 8 and 9 respectively by means of the bolts 11 and 12 or similar bolts. Preferably the different devices connected with the arm 17 are firmly secured together and to the arms by means of a single bolt 43, and the elements arranged with the arm 18 are likewise secured by means of a single bolt 44.

In Fig. 1 the draw-bar is indicated by broken lines as at 33' connected with the tongue 45 of a wagon or trailer 46 shown by broken lines so as to be drawn behind one of the driving wheels. The draw-bar is indicated also in an opposite position as at 33'' connected with the beam 47 of a plow 48 indicated by broken lines so as to be drawn behind the opposite one of the driving wheels of the tractor. The draw-bar may be set at other angles and may be secured in place by means of the stop pins.

In practical use, the draw-bar may be arranged so as to extend straight backward and be secured at the middle of the guide bars for pulling purposes, or the draw-bar may be left free to swing on its pivot if desired; or it may be adjusted to any desired angle and held by means of a stop pin arranged at one side, or if preferred at opposite sides of the draw-bar. When it is advantageous to pull a harvester or vehicle or a threshing machine behind one of the driving wheels of the tractor, it will be seen that a short turn can be made with the trailer behind the driving wheel on the outside of the curve described by the tractor in turning. When the tractor is pulling hard, although there is a tendency to lift the guiding wheels from the ground, this is counteracted by the improved draw-bar which extends considerably back from the driving axles and acts as a lever influenced by the heavy load drawn to hold the guiding wheels of the tractor to the ground.

Having thus described the invention, what is claimed as new is—

1. An improved tractor draw-bar apparatus comprising a pair of guide bars with pin-holes therein, a frame arm and a brace rod and also an angle brace secured together at one end thereof and to one end of the guide bars, a frame arm and a brace rod and also an angle brace secured together at one end thereof and to the opposite end of the guide bars, said brace rods being arranged upon the top of the upper ones of the guide bars and said angle braces upon the tops of the brace rods, said angle braces extending convergently each towards the other from the guide bars and also divergently from the plane of said frame arms to support the arms and the brace-rods laterally and vertically and to prevent longitudinal shifting of the guide bars, said arms being approximately under the angle braces, said brace rods being parallel each to the other, a base bar fixed to the opposite ends of said arms, and a draw-bar pivoted to the base bar and extending between the guide bars.

2. In an adjustable tractor draw-bar, the combination with a tractor having a differential gear case and a rearward gear housing below the case provided with a cap having a horizontal draft-plate thereon, a frame secured to said draft-plate and extending horizontally and also laterally therefrom, two guide bars on the end of the frame extending transversely thereof, there being pin-holes in the guide bar, and a draw-bar pivoted to said draft-plate and said frame and extending between the guide bars; two angle braces secured to the upper portion of said differential gear case and extending downwardly therefrom and also divergently each relatively to the other and to said frame and being secured to said guide bars at their opposite ends respectively.

3. In an adjustable tractor draw-bar, the combination with a tractor having a rearward gear housing structure and a horizontal draft-plate fixed thereon, of a base bar arranged upon said draft-plate and two top arms extending divergently therefrom, a base bar arranged under said draft-plate and two bottom arms extending divergently therefrom under and converging to the top arms, two bolts securing said base bars to said draft-plate, a curved top guide bar supported at its ends upon said top arms at the ends thereof and having pin-holes therein, a curved bottom guide bar arranged at its ends under said bottom arms at the ends thereof and having pin-holes therein, a brace rod connected at one end with the top guide bar at one end thereof and having a connecting device at the opposite end thereof rigidly secured to said housing structure, a brace rod connected at one end with the top guide bar at the opposite end thereof and having a connecting device at the opposite end thereof rigidly secured to said housing structure, a bolt rigidly securing one end of said guide bars to the adjacent brace rod and arms, a bolt rigidly securing the opposite end of said guide bar to the adjacent brace and arms, two strap plates pivotally connected with the middle portions of said base bars and said draft-plate, a tongue arranged between said strap plates and said guide bars, bolts adjustably securing the tongue to the strap plates, and stop-pins removably inserted in the pin-holes in said guide bars.

In testimony whereof, we affix our signatures in presence of two witnesses.

CLARK H. SELLARS.
CLAIRE J. SELLARS.

Witnesses:
WM. R. PARR,
E. P. HADLEY.